June 4, 1940. R. F. KNAACK 2,203,414
THERMAL ALARM
Filed Sept. 14, 1938 2 Sheets-Sheet 1
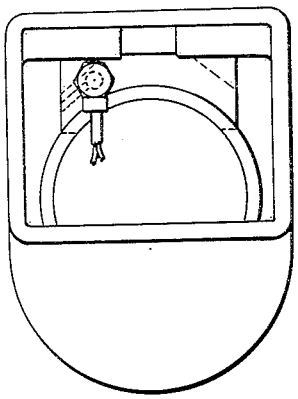
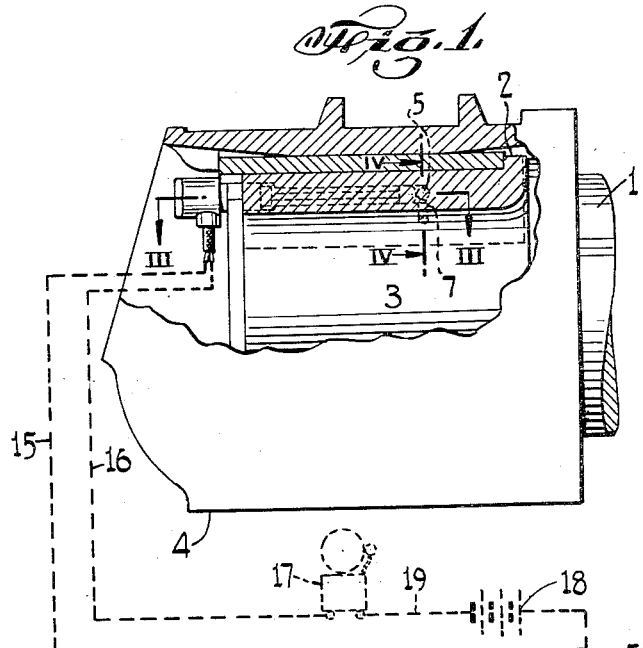
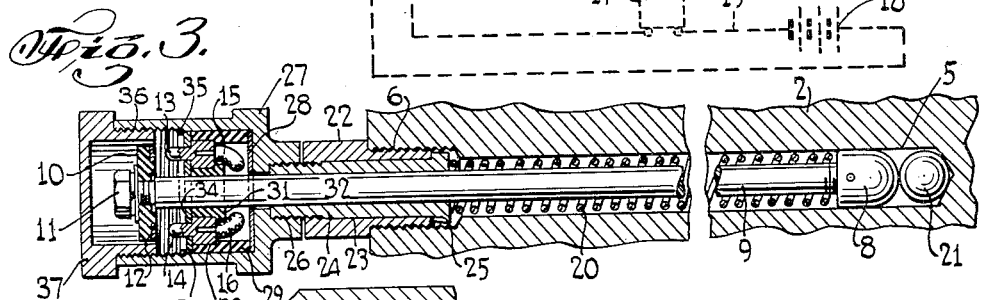
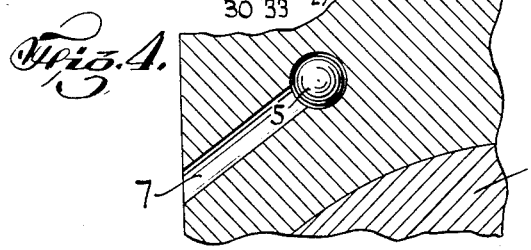
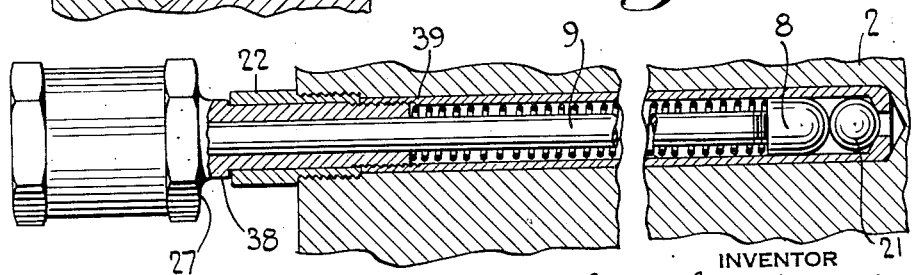
INVENTOR
Rudolph F. Knaack
BY
Lyman E. Dodge
ATTORNEY June 4, 1940.  R. F. KNAACK  2,203,414
THERMAL ALARM
Filed Sept. 14, 1938  2 Sheets-Sheet 2
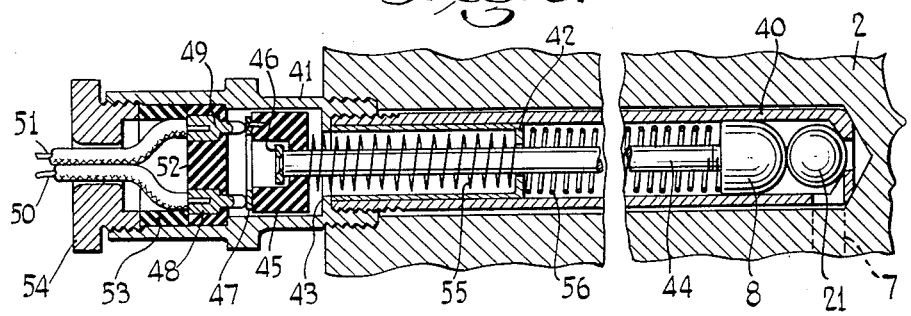
Fig. 6.
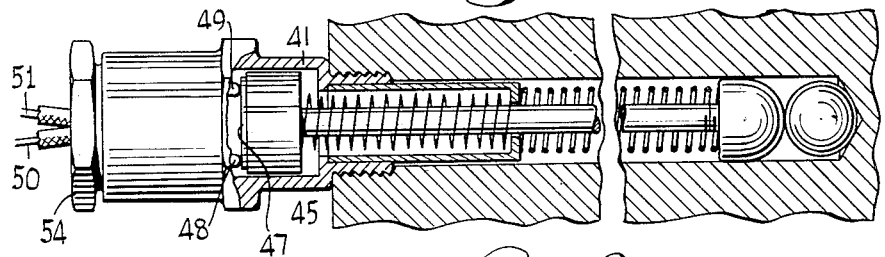
Fig. 7.
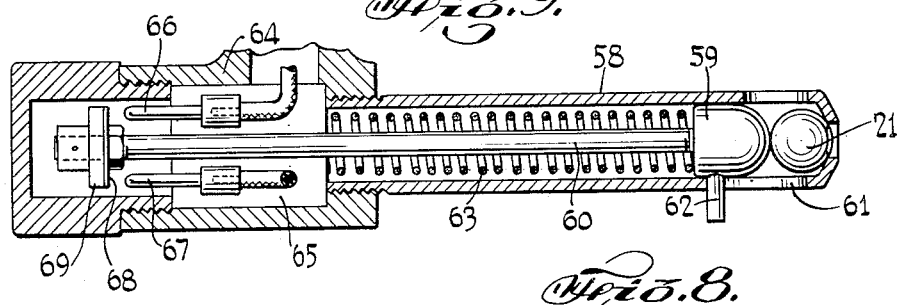
Fig. 9.
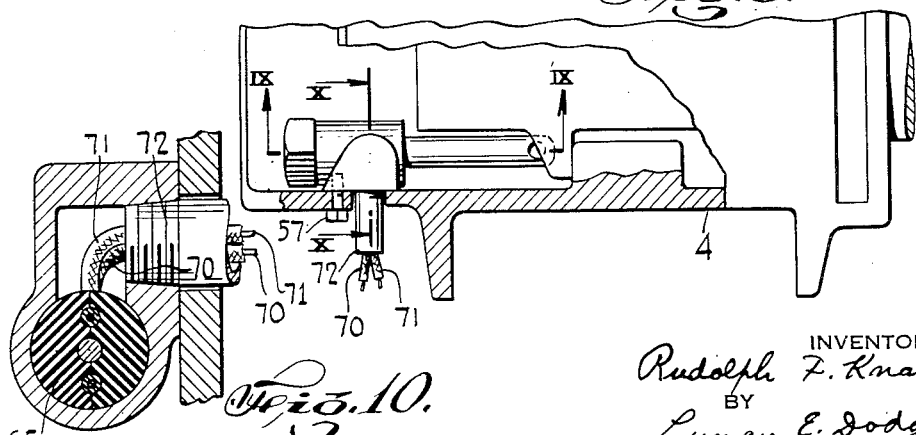
Fig. 8.
Fig. 10.
INVENTOR
Rudolph F. Knaack
BY
Lyman E. Dodge
ATTORNEY Patented June 4, 1940

2,203,414

UNITED STATES PATENT OFFICE 2,203,414

THERMAL ALARM

Rudolph F. Knaack, Brunswick, N. Y., assignor to Consolidated Car Heating Company, Inc., Albany, N. Y., a corporation of New York Application September 14, 1938, Serial No. 229,841

2 Claims. (Cl. 200—142)

This invention relates to heat responsive devices, particularly heat responsive devices designed to give an alarm upon an undesired rise in temperature, and more especially such devices especially applicable for giving an alarm upon overheating occurring in a journal, journal bearing, or journal box.

A principal object of this invention is the provision of the device of the type specified which will be extremely simple in construction, inexpensive to manufacture, adapted to be installed in place with the minimum of changes in the device to which it is applied, permanent in adjustment, and free from undue maintenance requirements.

Other objects and advantages will appear as the description of the particular physical embodiments selected to illustrate the invention progresses and the novel features will be particularly pointed out in the appended claims.

In describing the particular physical embodiments selected to illustrate the invention, reference will be had to the accompanying drawings and the characters of reference thereon in which like characters of reference designate like parts throughout the several views, and in which:

Figure 1 is a fragmentary elevational view of a journal, journal bearing, and journal box, with some parts broken away to more clearly show the construction to which has been applied one form of applicant's hot box indicator or alarm; Fig. 2 is an end view of the device as shown by Fig. 1; Fig. 3 is a horizontal cross-sectional view on the plane indicated by the line III—III of Fig. 1 viewed in the direction of the arrows at the ends of the line; Fig. 4 is a fragmentary end view of a journal bearing indicating the position of cavities therein formed for the reception of applicant's alarm box; Fig. 5 is a view corresponding to Fig. 3 but illustrative of the construction of the parts as slightly modified from those as shown by Fig. 3; Fig. 6 is a view corresponding to Fig. 3 but illustrative of a modified form of applicant's form; Fig. 7 shows a still further modified form of the applicant's alarm device; Fig. 8 is a plan view illustrating the positioning of a further modified form of applicant's alarm device when used in connection with a journal box; Fig. 9 is a fragmentary horizontal cross-sectional view on the plane indicated by the line IX—IX of Fig. 8, viewed in the direction of the arrows at the ends of the line; Fig. 10 is a fragmentary cross-sectional elevational view on the plane indicated by the line X—X of Fig. 8 viewed in the direction of the arrows at the ends of the line.

Mechanical engineers are well aware that journals and the bearings thereof frequently become unduly heated from many causes, especially the lack of oil. In many situations such heating is extremely dangerous. This is especially so in the case of the journals and journal bearings which are formed on the ends of railway car axles. For this reason, applicant has illustrated his hot box alarm in connection with a railway car axle.

In Fig. 1, numeral 1 designates the ordinary and well known railway car axle. 2 indicates the ordinary and well known, so-called, bearing brass. This member 2 is made of any suitable or appropriate anti-friction metal and when worn is replaceable. This member 2 is the real journal bearing, bearing directly upon the portion 3 of the axle 1 which forms the journal thereof.

4 designates as a whole the so-called, box.

All of the parts so far described are all well known and intended to represent the conventional construction.

If, due to lack of oil or other causes, heat is generated within the box 4, the seat thereof is the contacting surface between the journal 3 and the bearing 2. If this heat becomes excessive it may melt the bearing 2 and set fire to the contents of the box 4 which are usually oil soaked cotton waste and this in turn might well set fire to the car which is supported by the axle 1.

Applicant's alarm may be positioned in a variety of places but applicant considers the most desirable position for his alarm to be within a cavity in the bearing 2. To this end in applying his device he first forms a cavity 5 in the bearing 2. This cavity is well shown in end view in Fig. 4 and in side view in Fig. 3. For the purpose of applicant's particular form of alarm as illustrated in Figs. 1 to 4 inclusive it is necessary to form the cavity in the bearing member 2 of two diameters. The larger portion of the cavity, that is, the portion as shown to the right of Fig. 3 is of one diameter and smaller than the diameter of that portion somewhat to the left in Fig. 3 at 6. This portion of the cavity is of larger diameter and is formed with a screw thread as shown at 6. The cavity 5 at its inner end is connected with an outlet bore 7 as well shown in Fig. 4 and also shown in Fig. 1. This outlet bore 7 is, as will be hereinafter more fully pointed out, for the purpose of furnishing an outlet for molten metal.

Applicant's alarm device proper includes a piston or plunger 8 fastened in any suitable or appropriate manner as by inter-engaging screw threads upon the piston rod 9. The piston rod 9 at its other end carries the disc 10 formed of any appropriate material preferably insulating material and secured to the end of the plunger 9 by seating against the shoulder thereof and restrained from movement over the end thereof by any suitable means such as a nut 11 threaded on to the reduced threaded end of the plunger 9.

The disc 10 carries an annulus of electrical conducting material 12 secured thereto in any suitable or appropriate manner.

Juxtaposed to the annulus 12 are two terminals 13 and 14. These two terminals are electrically isolated one from the other and each has an electrical conductor as 15 and 16 attached thereto, suitably insulated and carried to any desired point to actuate any desired electrical device. In the drawings, Fig. 1, the wires 15 and 16 are shown as connected, one to a vibrating bell 17, the other to one terminal 18 of a battery, the other terminal of the battery being connected by the wire 19 to the vibrating bell 17.

When the metallic annulus 12 is in contact with the terminals 13 and 14 no current flows through the vibrating bell 17. If the plunger 9 is moved to the right as shown in Fig. 3 so that the annulus 12 comes in contact with the terminals 13 and 14 then a circuit is formed through the vibrating bell 17 and it is caused to sound.

The bell 17 is only sounded when the temperature of the bearing has been raised to an undesired degree. In order to have the annulus 12 contact with the terminals 13 and 14 when the temperature has been raised, applicant provides a spring 20, best shown in Fig. 3 which biases the plunger 8 toward the right as shown in Fig. 3 but it is normally restrained from such movement by the member 21 which is of any desired or appropriate form, here shown as a round pellet formed of any desired or appropriate material, fusible at the temperature at which it is desired to have the vibrating bell 17 sound. If the temperature of the bearing 2 reaches the desired point, the material of the pellet 21 fuses or melts and runs out through the outlet 7, best shown in Fig. 4 whereupon the spring 20 throws the plunger 8 and the piston rod 9 to the right bringing the annulus 12 into contact with the terminals 13 and 14 thus causing the vibrating bell 17 to sound and giving notice that the temperature of the bearing has reached a dangerous height and that steps should be immediately taken to remedy the undesired condition.

Applicant makes no particular specification as to the position of the warning signal 17 or its nature and does not mean to exclude its positioning at any desired selected place in the car supported by the axle 1 or anywhere in the train of which the car supported by the axle 1 is a part. Further, it is to be understood that the showing of a vibrating bell is not intended to exclude the use in place thereof of any other proper or desired audible, visual, or other electrically operable indicating means.

In order to properly support the piston rod 9 for reciprocation, applicant prefers a construction as most clearly shown in Fig. 3 in which a nipple 22 is externally screw threaded and shouldered and screwed into the bearing member 2 and is also provided in a thorough bore 23 thereof with a piston rod sleeve 24 which fits the internal bore of the nipple 22, has a shoulder end 25 which bears against the inner end of the nipple and has a threaded end 26 extending beyond the outer face of the nipple 22.

The threaded end 26 of the sleeve 24 affords a means by which a hollow protecting casing 27 may be attached. This protecting casing encloses and protects the electric terminals as 12, 13 and 14. The casing or head 27 is provided with a bottom liner 28, an annular side liner 29, and a hold-in disc 30 and a terminal spacer 31. The terminal spacer 31 has shoulders thereon as at 32 and the annular liner 29 has a shoulder thereon as at 33 against which bear the terminals as 13 and 14 to prevent movement toward the right as shown in Fig. 3. These shoulders cooperate with the shoulders as 34 formed on the terminals together with disc 30 to hold the terminals in place. In order to hold all of the parts comprising the liners and terminals in place, a spring ring 35 is sprung into a threaded groove in the interior of the casing 27.

The internally threaded groove 36 in the casing 27 serves as a means for attaching the externally threaded cap 37.

When, due to an undesired rise in temperature, a pellet 21 melts and the alarm 17 indicates the rise in temperature an attendant takes the necessary steps to reduce the temperature within the box 4. If this merely requires more oil or a slight wait, the nipple 22 is unscrewed from the bearing member 2, a new pellet 21 placed in the cavity in the bearing and then the nipple 22 replaced together with the parts carried thereby. If a new bearing member 2 is required then the nipple 22 with the parts carried thereby is placed in the cavity in the new bearing member after a pellet as 21 is placed in the cavity thereof.

In Fig. 5 a modification of the alarm device is shown which differs from that as shown in Fig. 3 in that in Fig. 5 the casing 27 is provided with an integral stem 38 which passes through the nipple 22 and is screw threaded into a bearing member cavity liner 39.

In the form of device shown in Fig. 5 the pellet may be put in place within the liner 39 before the liner is put into position in the bearing member 2 or the stem 38 may be unscrewed and removed together with the plunger 8 and rod 9 and then after a pellet 21 has been put into the mouth of the liner 39 the parts may be returned to the position as shown in Fig. 5.

In the modified form as shown by Fig. 6, a liner 40 for the cavity in the bearing member 2 is used but the protecting head 41 is screw threaded directly into the bearing member 2 and the liner 40 is screw threaded into the head 41. In addition, a spring abutment 42 is positioned within the liner 40 abutting at the left hand end, as shown in Fig. 6, against a circular abutment 43 in the form of an internal flange of the head 41.

The piston rod 44 of the form shown in Fig. 6 passes loosely through the electrical conducting ring support 45 but is provided on its end with a piston head 46 so that the piston rod 44 may move to the left, as viewed in Fig. 6, without moving the support 45 but when it moves to the right the full distance allowed by the melting of pellet 21 the piston rod head 46 contacts with the support 45 and moves it to the right, as viewed in Fig. 6, thereby moving the electrical conducting ring 47 out of contact with the terminals 48 and 49 thereby breaking the circuit of the alarm device connected with the wires 50 and 51 which correspond to wires 15 and 16 of Fig. 1.

In the form of device as shown by Fig. 6, the terminals 48 and 49 are supported by an insulating block 52 fitting the inner wall of the head 41 and are held in place by the fastening annulus 53 which in turn is held in place by the externally threaded closing cap 54.

In the form shown by Fig. 6 two springs are employed, one 55 bears at one end against the spring shoulder 42 and the other against the support 45 and acts to move support 45 to the left as in Fig. 6 so that the electrical contacting ring 47 contacts with the terminals 48 and 49 when the support is free from a pull by the piston rod 44.

Spring 56 is stronger than spring 55 and serves to move the plunger 8 together with the rod 44 to the right as viewed in Fig. 6 when the pellet 21 is melted and so moves support 45 toward the right breaking the contact at the terminals.

The form of device shown in Fig. 7 is very similar to the form shown in Fig. 6 except that the internal liner 40 has been omitted.

The form as shown in Fig. 9 is intended to be placed in the box 4 but not into the bearing member 2 and is attached to the box as by the cap screw 57 or in any other suitable or appropriate manner.

In the form of device shown by Fig. 9, there is a hollow stem 58 in which is positioned the fusible pellet 21 and a plunger 59 attached to a rod 60. The hollow stem 58 is provided with a slot at 61 through which the pellet 21 may be introduced. In order to introduce this pellet the hand stem 62 on the plunger 59 is grasped and pulled to the left as viewed in Fig. 9, then the pellet 21 is introduced through the slot and the hand stem 62 released whereupon the spring 63 forces the plunger against the pellet 21 so as to retain it in place.

In the form as shown by Fig. 9 the hollow stem 58 is screw threaded into the head or hollow casing 64. Within the hollow casing 64 is a split cylinder of insulating material 65 through which the plunger 60 passes and which serves to support the terminals 66 and 67. These terminals 66 and 67 are juxtaposed to the electrical conducting ring 68 supported by insulation 69 carried by the rod 60.

In the form as shown by Fig. 9 and as particularly best shown by Fig. 10, the wires 70 and 71 pass out through the side of the box 4 through a duct 72 which is screw threaded into the head 64.

In the form of device as shown by Figs. 8, 9 and 10 it is unnecessary to move anything except the hand stem 62 in replacing a melted pellet 21 and this can easily be done through the usual opening in the parts at the front thereof.

From the above description, it will be seen that applicant has provided a simple, easily constructed and installed hot journaled alarm which is easy to maintain and easy to manipulate and which gives a positive alarm. In the forms as shown by Figs. 1 to 4 inclusive the device would be calld an open circuit device as is device as shown by Figs. 8, 9 and 10, while the device as shown by Figs. 6 and 7 is a closed circuit device in that the alarm is sounded only when the circuit is opened whereas in the former case the alarm is sounded when the circuit is closed. Of, course, the alarm device would be changed to any of the ordinary or proper forms in order to properly cooperate with either the open or closed circuit form. In the open circuit form as shown by Fig. 1 the ordinary vibrating bell could be used. In the open circuit form as shown by Figs. 6 and 7 it would be necessary, in accordance with the usual practice, to interpose a relay in the circuit which would be normally energized but which would be deenergized upon the breaking of the contacts and would thereby close the circuit for the alarm as 17, as is common practice.

Although applicant has particularly described several specific physical embodiments of the idea of means underlying his invention, nevertheless, it is desired to have it understood that the particular forms selected are merely illustrative but do not exhaust the possible physical embodiments of the idea of means underlying the invention.

What is claimed as new and desired to secure by Letters Patent of the United States, is:

1. In an alarm device for bearings, in combination: a nipple formed with external screw threads adapted to be screw threaded into an internally screw threaded cavity formed in a bearing member; a sleeve fitting within the nipple and formed with a shoulder at one end bearing against one end of the nipple and further formed with a through bore and with the end opposite the shoulder externally screw threaded; a hollow head formed with internal threads adapted for being threaded upon screw threaded end of the sleeve and formed with a bore; a rod passing through the sleeve and through the bore in the head; a fusible pellet positioned opposite one end of the rod; an electrical conducting member carried by the other end of the rod; means including electrical terminals cooperating with the electrical conducting member carried by the rod; an abutment on the rod; and a spring interposed between the said abutment and the sleeve whereby while the pellet is intact the electrical contacts are separated but when the pellet is fused the spring moves the rod and brings the contacts together by means controlled by the contacts for giving an alarm.

2. In an alarm for bearings, in combination: a hollow head; an annular insulating member fitting within the head and formed with a shoulder; a spacing member of insulating material formed with a shoulder and positioned centrally of the said annulus; two electrical conducting terminals one positioned on one side of the spacing member and one positioned on the other side thereof and each bearing against the shoulders of the spacing member and the annulus; a disc of insulating material formed with two bores, said terminals each having a reduced portion forming shoulders and said disc receiving the reduced portions and bearing against the shoulders; a spring ring in contact with the disc, said head being formed with a groove to receive the spring ring whereby the terminals are held securely in place.

RUDOLPH F. KNAACK.